Sept 17, 1957  J. E. NORRIS  2,806,556
EMERGENCY BRAKE
Filed March 17, 1955
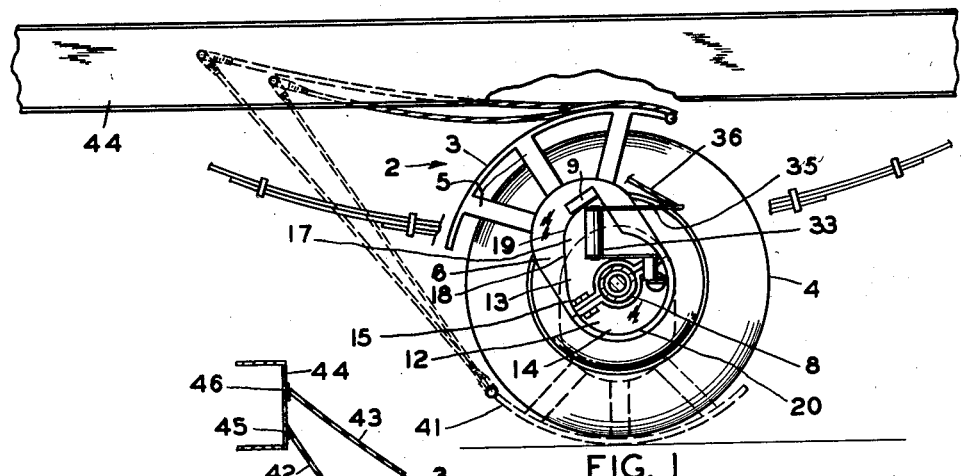
FIG. 1
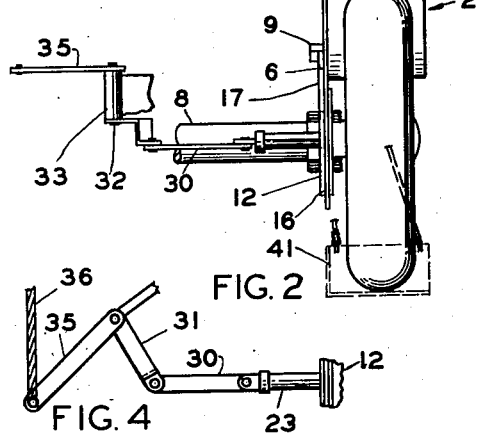
FIG. 2
FIG. 4
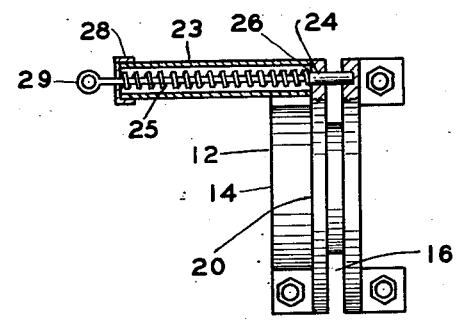
FIG. 3
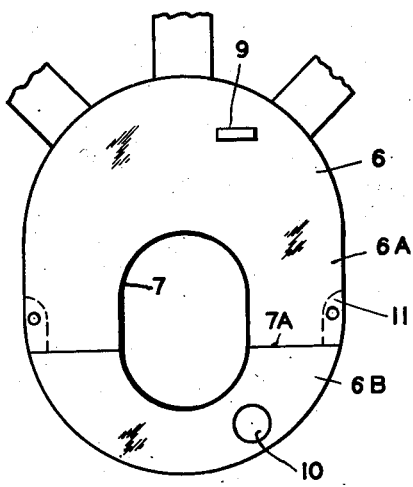
FIG. 5
INVENTOR.
Jack E. Norris
BY
Scott L. Norviel
atty United States Patent Office 2,806,556
Patented Sept. 17, 1957

2,806,556
EMERGENCY BRAKE

Jack E. Norris, Tempe, Ariz., assignor of one-half to Rosa Mitchell

Application March 17, 1955, Serial No. 494,986

2 Claims. (Cl. 188—4)

This invention relates to emergency shoe brakes for trucks and the like.

More particularly the invention relates to a new and improved means of support for shoe brakes of the type which may be applied in emergencies to the wheels of automotive vehicles and which will cover the lower peripheral portion of the wheel so that the vehicle slides on the shoe.

One of the objects of the invention is to provide a shoe brake, of the type mentioned, with an improved means for support when not in use and with an easily constructed and efficient means for releasing the shoe so that it will move into active operating position.

Another object is to provide a shoe brake having a shoe of approximately the same curvature as the periphery of the wheel to which it is to be applied, supported on a plate having a hole through which the axle of the wheel extends, combined with a supporting element attached to the axle having an eccentric cam surface which will contact a lug on the shoe supporting plate and move the brake shoe away from the wheel as it is lifted from a lower operative position to an upper inoperative carrying position;

Still another object is to provide a carrying and lifting mechanism which has a latch operatable from the driver's compartment of the vehicle which will easily and efficiently release the brake shoe so that it will follow the wheel in the direction of its rotation until stopped by cable members attached directly to the vehicle frame.

Other objects will appear hereinafter.

I attain the foregoing objects by means of the devices, parts, combination of parts, and particular construction shown in the accompanying drawings wherein—

Figure 1 is an elevational view of the device as applied to a vehicle wheel, taken from the inside of the wheel and looking outward;

Figure 2 is a side elevation of the vehicle wheel with the device applied thereto and viewed from the rear of the vehicle;

Figure 3 is a view of the attaching and supporting mechanism viewed from beneath with portions thereof shown in section;

Figure 4 is a top plan view of the releasing mechanism link construction; and

Figure 5 is an elevational view of the supporting plate of the shoe, drawn on an enlarged scale.

Similar numerals refer to similar parts in the several views.

The brake shoe, generally indicated by numeral 2, has an arcuately curved outer portion on which the wheel rides when it is moved into operating position and wherein the arcuately curved outer shoe portion 3 approximates the peripheral curve of the wheel 4.

This outwardly curved shoe portion 3 is supported on three substantially radially extending bars 5 which are attached to a shoe supporting plate 6. This plate has a large slot or elongated hole 7 which is held and rotates in annular groove 16 of composite supporting element 12 and in which plate 6 may also be slid radially. On its inner face the plate has a flat outwardly extending lug 9. It is also provided with a latch pin receiving hole 10. Plate 6 is made in two parts 6a and 6b joined along a horizontal seam 7a, and held together by screws extending through overlapping tabs 11.

A supporting element 12 consists of upper part 13, a lower part 14, each having semi-circular collar parts which clamp onto the vehicle axle 8. The two parts are held together by bolts 15. When bolted together parts 13 and 14 provide an annular groove 16, between annular raised portions, which receives the edge portions of plate 6 surrounding hole 7 therein.

The upper part 13 of this supporting element also has a flange 17 extending at right angles to the axis of the axle and which has an outer cam surface 18 providing a lifting surface 19 which engages lug 9 on shoe supporting plate 6. The lower part 14 of the supporting element has a semi-circular flange 20 which supports a latch guide tube 23 extending inwardly from the wheel of the vehicle. This tube houses a latch bolt 24 and a helical spring 25 which surrounds the bolt. At its inner end spring 25 pushes against a shoulder 26 on the latch bolt. At its outer end the spring pushes against a closing cap 28 threaded on the outer end of guide tube 23. An eye 29 on the outer end of the latch bar is hinged to a link 30 which, in turn, is hinged to crank 31 on a vertical shaft 32. This shaft is journalled in a tubular housing 33 attached to the inner portion of the vehicle axle 8. On the upper end of this pin there is a second crank 35 which is attached by cable 36 to a lever (not shown) in the vehicle driving compartment.

The resultant overall structure, above described, provides a means for retracting the latch bolt 24 from hole 10 in shoe supporting plate 6 so that the supporting plate and shoe will drop from its inoperative raised position to a lowered position with the inner face of the shoe contacting the wheel. After contact is made the shoe follows the wheel around to the operating position indicated by dotted lines 41 in Figures 1 and 2. In this operating position rotary motion of the shoe is stopped by cables 42 and 43 attached to the front edge of the shoe and to frame 44 of the motor vehicle at positions 45 and 46.

When it is desired to reset the shoe to carrying position, the vehicle is rolled to the rear until it rolls off the shoe, or the wheel is jacked up, so that the shoe can be rotated around the wheel. In doing this lug 9 on the shoe supporting plate 6 follows the contour edge 18 of the cam flange 17 on the supporting member 12 until it completes its motion around the lift at the top of the cam. This locates the shoe in its upper position, as shown in solid lines in Figure 1. When this position is reached the latch bolt engages in hole 10 in plate 6 and the shoe is held in the upper raised position where it is inoperative as a brake and acts as a fender or mud guard for wheel 4. Numeral 8 refers to the axle broadly and means the axle housing as well as the live axle inside. All parts attached to the axle 8, as above mentioned, are attached to the housing.

When in raised or inoperative position, as shown in Figure 1, in solid lines the shoe is forward of top dead center and poised to drop toward the wheel 4 and rotate around it and under it until stopped by cables 42 and 43. The brake is then in lowered or operative position, as indicated by dotted outline 41. The cables hold it so that it stays under the wheel and the wheel slides on the shoe until the vehicle stops.

I claim:

1. An emergency shoe type brake for motor vehicles consisting of an arcuate brake shoe adapted to be supported over a wheel to be braked when inoperative and when operative, to swing under a peripheral portion of the wheel to be braked, including a plate adjacent the inner face of said wheel supporting said shoe having an elongated hole, a latch bolt hole, and an inwardly extending cam lug, a two part supporting element clampably attached to the wheel axle adjacent the inner face of said wheel having a peripheral groove journaling and receiving the portion of said plate surrounding said hole therein, and a cam with an edge surface engaging said plate lug providing a lift to raise said plate when said shoe is moved to inoperative position above the upper portion of said wheel, a latch bolt operating in said supporting member and engaging in said hole in said plate and cables connecting the shoe to the frame of the motor vehicle to prevent rotation of the shoe beyond braking position beneath said wheel.

2. In motor vehicles having a frame, a wheel mounted on an axle supporting said axle, driving mechanism, and a driving compartment, a shoe type brake composed of an arcuate body having a curve that equals the curve of the wheel to be braked connected by radially extending bars to a supporting plate, a two part supporting element clampably attached to said axle adjacent said wheel, having an annular groove to receive said plate and a radially positioned axially parallel spring loaded latch bolt slidably operating across said groove, and an upwardly extending flange having a cam surface on its upper edge arcuately rising in a direction opposite to the direction of rotation of said wheel; said supporting plate having a centrally disposed radially elongated hole enabling the plate portions surrounding the hole to surround said supporting element and enclosed in said groove, and having a lug on its inner face riding on the cam surface of said supporting element flange, and having a latch bolt receiving hole disposed to receive said latch bolt and hold said plate so that said brake shoe is held in inoperative position above the periphery of said wheel and forward of dead center, means in the driving compartment of said vehicle for withdrawing said latch bolt from said supporting plate releasing said plate so that said shoe will swing arcuately under said wheel, and cables attaching said shoe to said frame to retard rotation of said shoe and hold it in braking position under said wheel.

References Cited in the file of this patent

UNITED STATES PATENTS

| | | |
|---|---|---|
| 1,562,702 | Icre | Nov. 24, 1925 |
| 2,083,631 | Ballard | June 15, 1937 |
| 2,085,385 | Perillo | June 29, 1937 |

FOREIGN PATENTS

| | | |
|---|---|---|
| 669,781 | Germany | Jan. 14, 1939 |